United States Patent
Yi et al.

(10) Patent No.: US 9,392,630 B2
(45) Date of Patent: Jul. 12, 2016

(54) METHOD FOR WIRELESS FIDELITY PEER-TO-PEER COMMUNICATION AND DEVICE THEREFOR

(75) Inventors: Yunjung Yi, Anyang-si (KR); Suhwook Kim, Anyang-si (KR); Bonghoe Kim, Anyang-si (KR); Jaewon Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 314 days.

(21) Appl. No.: 14/343,717

(22) PCT Filed: Sep. 10, 2012

(86) PCT No.: PCT/KR2012/007271
§ 371 (c)(1),
(2), (4) Date: Mar. 7, 2014

(87) PCT Pub. No.: WO2013/036092
PCT Pub. Date: Mar. 14, 2013

(65) Prior Publication Data
US 2014/0226639 A1 Aug. 14, 2014

Related U.S. Application Data

(60) Provisional application No. 61/532,569, filed on Sep. 9, 2011.

(51) Int. Cl.
*H04W 4/00* (2009.01)
*H04W 76/02* (2009.01)
*H04W 74/04* (2009.01)
*H04W 8/00* (2009.01)
*H04W 84/18* (2009.01)

(52) U.S. Cl.
CPC ............ *H04W 76/023* (2013.01); *H04W 8/005* (2013.01); *H04W 74/04* (2013.01); *H04W 84/18* (2013.01)

(58) Field of Classification Search
CPC ... H04W 76/023; H04W 74/04; H04W 8/005; H04W 84/18; H04W 4/005; H04W 4/006; H04W 4/008; H04W 52/0016; H04W 52/0019; H04W 72/0446; H04W 88/08; H04W 88/085; H04W 88/10; H04W 88/12
USPC ................. 455/450–452.1, 426.1–426.2, 448
See application file for complete search history.

(56) References Cited

FOREIGN PATENT DOCUMENTS

| KR | 1020100097723 | 9/2010 |
|---|---|---|
| KR | 1020110073239 | 6/2011 |
| WO | 2011062404 | 5/2011 |
| WO | 2011062841 | 5/2011 |

OTHER PUBLICATIONS

PCT International Application No. PCT/KR2012/007271, Written Opinion of the International Searching Authority dated Feb. 28, 2013, 18 pages.

*Primary Examiner* — Thai Hoang
(74) *Attorney, Agent, or Firm* — Lee, Hong, Degerman, Kang & Waimey; Jonathan Kang; Richard Salfelder

(57) ABSTRACT

The present invention relates to a wireless communication system. More specifically, the present invention relates to a method for performing Wi-Fi P2P communication and a device therefor, and the method comprises the steps of: receiving a first beacon message from an owner of a Wi-Fi P2P group; and confirming a plurality of slots which are formed between a time when the first beacon message is received and a time when a next second beacon message is received, by using the first beacon message, wherein each slot of the plurality of the slots corresponds to one service type, and in one or more slots corresponding to interested services among the plurality of the slots, a Wi-Fi P2P device performs an operation for Wi-Fi P2P communication, and in one or more slots corresponding to uninterested services among the plurality of slots, the Wi-Fi P2P device stands by in a sleep mode.

16 Claims, 10 Drawing Sheets

METHOD FOR WIRELESS FIDELITY PEER-TO-PEER COMMUNICATION AND DEVICE THEREFOR

CROSS-REFERENCE TO RELATED APPLICATIONS

This application is the National Stage filing under 35 U.S.C. 371 of International Application No. PCT/KR2012/007271, filed on Sep. 10, 2012, which claims the benefit of U.S. Provisional Application No. 61/532,569, filed on Sep. 9, 2011, the contents of which are hereby incorporated by reference herein in their entirety.

TECHNICAL FIELD

The present invention relates to a method and apparatus for performing Wireless Fidelity (Wi-Fi) Peer to Peer (P2P) communication in a wireless communication system, and more particularly to a method and apparatus for discovering a neighbor for Wi-Fi P2P communication and a method and apparatus for performing data communication.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

Standards for Wireless Local Area Network (WLAN) technology have been developed as Institute of Electrical and Electronics Engineers (IEEE) 802.11 specifications. IEEE 802.11b may provide a maximum transfer rate of 11 Mbps, and IEEE 802.11a may provide a maximum transfer rate of 54 Mbps. IEEE 802.11g may use Orthogonal Frequency Division Multiplexing (OFDM) at 2.4 GHz, and provide a transfer rate of 54 Mbps. IEEE 802.11n may use Multiple Input Multiple Output (MIMO)-OFDM, and provide a transfer rate of 300 Mbps to four spatial streams. IEEE 802.11a and 802.11b use an unlicensed band at 2.4 GHz or 5 GHz. IEEE 802.11b provides a transmission rate of 11 Mbps and IEEE 802.11a provides a transmission rate of 54 Mbps. IEEE 802.11g applies Orthogonal Frequency-Division Multiplexing (OFDM) at 2.4 GHz to provide a transmission rate of 54 Mbps. IEEE 802.11n may use Multiple Input Multiple Output (MIMO)-OFDM, and provide a transfer rate of 300 Mbps. IEEE 802.11n may support a channel bandwidth up to 40 MHz to provide a transfer rate of 600 Mbps. IEEE 802.11p is a standard for supporting Wireless Access in Vehicular Environment (WAVE). For example, IEEE 802.11p provides improvement matters needed to support Intelligent Transportation Systems (ITS). IEEE 802.11ai is a standard for supporting fast initial link setup of an IEEE 802.11 station (STA).

In recent times, Wireless Fidelity (Wi-Fi) alliance has announced Wi-Fi based P2P technology (e.g., Wi-Fi Direct (WFD)) and has authenticated the Wi-Fi based P2P technology. The Wi-Fi P2P technology is applied to portable devices (e.g., TVs, laptops, printers, cameras, etc.) and mobile phones, such that the Wi-Fi P2P technology can provide Machine-to-Machine (M2M) content and services through direct UE-to-UE communication without using an additional device such as an Access Point (AP) or a router. The Wi-Fi P2P technology provides a high transfer rate, so that it is expected that the Wi-Fi P2P technology can be replaced with Bluetooth technology within some regions.

DISCLOSURE

Technical Problem

An object of the present invention is to provide a method and apparatus for efficiently performing Wi-Fi P2P communication in a wireless communication system. Another object of the present invention is to provide a method and apparatus for efficiently discovering neighbors for Wi-Fi P2P communication, and a method and apparatus for efficiently performing control information/data communication.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing communication using a wireless fidelity (Wi-Fi) peer to peer (P2P) device including: receiving a first beacon message from an owner of a Wi-Fi P2P group; and identifying a plurality of slots arranged between a reception time of the first beacon message and a reception time of a second beacon message subsequent to the first beacon message, using the first beacon message, wherein each of the slots corresponds to one service type, the Wi-Fi P2P device performs operations of Wi-Fi P2P communication in one or more slots corresponding to an interested service from among the plurality of slots, and the Wi-Fi P2P device is in a sleep mode in one or more slots corresponding to a non-interested service from among the plurality of slots.

In another aspect of the present invention, a wireless fidelity (Wi-Fi) peer to peer (P2P) device configured to perform a Wi-Fi P2P communication includes: a radio frequency (RF) unit; and a processor. The processor is configured to receive a first beacon message from an owner of a Wi-Fi P2P group, identify a plurality of slots arranged between a reception time of the first beacon message and a reception time of a second beacon message subsequent to the first beacon message, using the first beacon message. Each of the slots corresponds to one service type. The processor is configured to perform operations of Wi-Fi P2P communication in one or more slots corresponding to an interested service from among the plurality of slots, and is in a sleep mode in one or more slots corresponding to a non-interested service from among the plurality of slots.

Each slot may correspond to one logical channel.

Each slot may include a first sub-slot for a control channel and a second sub-slot for a data channel, wherein the first sub-slot and the second sub-slot are multiplexed according to a Time Division Multiplexing (TDM) scheme.

The first beacon message may include at least one of information indicating a beacon message interval including the plurality of slots and information indicating a length of a service cycle.

The first beacon message may further include at least one of information indicating the number of a plurality of slots, information indicating a start time of each slot, and information indicating a length of each slot.

Each slot may include a first sub-slot for a control channel and a second sub-slot for a data channel, and the first beacon message may include at least one of information indicating a length of the first sub-slot per slot and information indicating a length of the second sub-slot per slot.

The first beacon message may include a slot identifier (ID) of each slot, a service type of each slot, and information regarding the number of Wi-Fi P2P devices registered for the service type.

Advantageous Effects

As is apparent from the above description, the embodiments of the present invention can efficiently perform Wi-Fi P2P communication in a wireless communication system. In more detail, the embodiments can efficiently discover a neighbor for Wi-Fi P2P communication and can also efficiently perform control information/data communication.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), OFDM (Orthogonal Frequency Division Multiplexing), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as IEEE 802.16 (WiMAX), IEEE 802-20, and E-UTRA (Evolved UTRA). OFDM may be implemented through wireless (or radio) technology such as IEEE 802.11.

For clarity, the following description focuses on IEEE 802.11 (Wi-Fi). However, technical features of the present invention are not limited thereto. For example, exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

It should be noted that specific terms disclosed in the present invention are proposed for convenience of description and better understanding of the present invention, and the use of these specific terms may be changed to other formats within the technical scope or spirit of the present invention. In some instances, well-known structures and devices are omitted in order to avoid obscuring the concepts of the present invention and the important functions of the structures and devices are shown in block diagram form. The same reference numbers will be used throughout the drawings to refer to the same or like parts. The order of operations to be disclosed in the embodiments of the present invention may be changed. Some components or characteristics of any embodiment may also be included in other embodiments, or may be replaced with those of the other embodiments as necessary.

Figure 1:
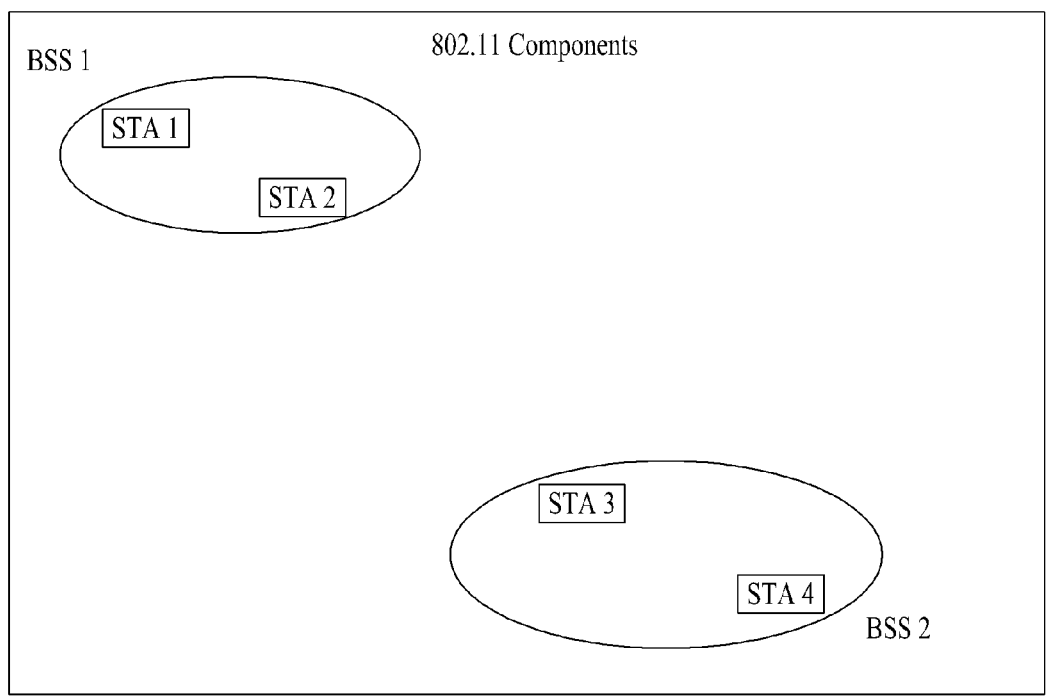
FIG. 1 exemplarily shows an IEEE 802.11 system according to one embodiment of the present invention.

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). In this case, STA may operate according to MAC (Medium Access Control)/PHY (Physical) rules. STA may include an Access Point (AP) STA (hereinafter referred to as an AP) and a non-AP STA. AP may provide network (e.g., WLAN) connection to a non-AP STA through a radio interface. AP may be implemented as a fixed type or a mobile type, and may include mobile wireless devices (e.g., a laptop computer, a smartphone, etc.) for providing a hot spot. The AP may correspond to a base station (BS), a Node-B, an evolved Node-B (eNB), a base transceiver system (BTS), a femto BS, etc. The non-AP STA may correspond to a handheld device, for example, a laptop computer, a PDA, a wireless modem, a smartphone, etc. In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS).

An ellipse indicating the BSS in FIG. 1 may be understood as a coverage area in which STAs included in the corresponding BSS maintain communication. This area may be referred to as a Basic Service Area (BSA). In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS.

Figure 2:
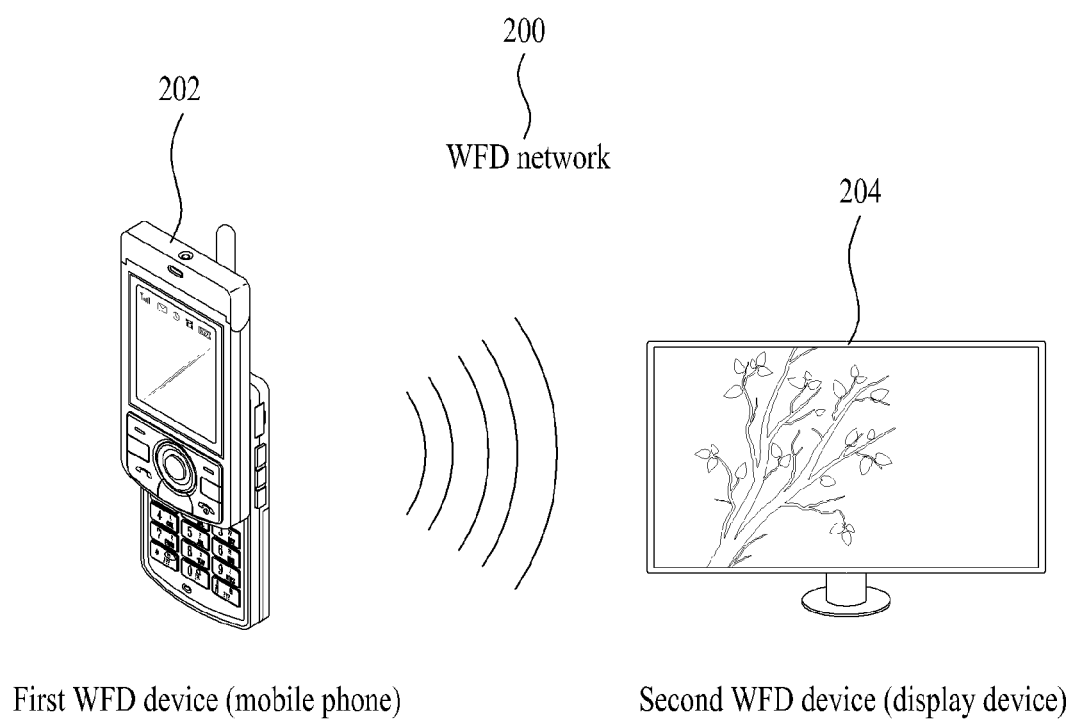
FIG. 2 is a conceptual diagram illustrating a Wi-Fi P2P (e.g., Wi-Fi Direct (WFD) P2P) network.

FIG. 2 is a conceptual diagram illustrating a Wi-Fi P2P (e.g., Wi-Fi Direct (WFD)) network. The Wi-Fi P2P network can enable the Wi-Fi devices not to participate in a home network, an office network, a hot-spot network, and performs Device to Device (D2D) (or Peer to Peer: P2P) communication. Hereinafter, Wi-Fi based P2P communication is referred to as Wi-Fi P2P communication (simply, P2P communication) or Wi-Fi D2D communication (simply, D2D communication). In addition, the Wi-Fi P2P execution device will hereinafter be referred to as a Wi-Fi P2P device (simply a P2P device).

Referring to FIG. 2, the Wi-Fi P2P network 200 may include at least one Wi-Fi device configured to include a first Wi-Fi P2P device 202 and a second Wi-Fi P2P device 204. The Wi-Fi P2P device may include Wi-Fi supporting devices, for example, a display device, a printer, a digital camera, a projector, a smartphone, etc. In addition, the Wi-Fi P2P device may include a non-AP STA and an AP STA. In this example, the first Wi-Fi P2P device 202 is a smartphone, and a second Wi-Fi P2P device 204 is a display device. Here, Wi-Fi P2P communication is mounted to portable devices and mobile phones, such that the Wi-Fi P2P communication can provide Machine-to-Machine (M2M) content and services through direct UE-to-UE communication without using an additional device such as an Access Point (AP) or a router. The Wi-Fi P2P devices of the Wi-Fi P2P network may be directly interconnected. In more detail, P2P communication may indicate that a signal transmission path between two Wi-Fi P2P devices is directly configured in the corresponding Wi-Fi P2P devices without passing through a third device (e.g., AP) or a legacy network (e.g., a network coupled to WLAN through an AP). In this case, a signal transmission path directly configured between two Wi-Fi P2P devices may be limited to a data transmission path. For example, Wi-Fi P2P communication may indicate that a plurality of non-STAs transmits data (e.g., voice, image, text information, etc.) without passing through the AP. A signal transmission path for control information (e.g., resource allocation information for P2P configuration, wireless device ID information, etc.) may be directly configured between Wi-Fi P2P devices (e.g., non-AP STA to non-AP STA, non-AP STA to AP), may be configured between two Wi-Fi P2P devices (e.g., non-AP to non-AP STA) via the AP, or may be configured between the AP and the corresponding Wi-Fi P2P device (e.g., AP to non-AP STA #1, AP to non-AP STA #2).

Figure 3:
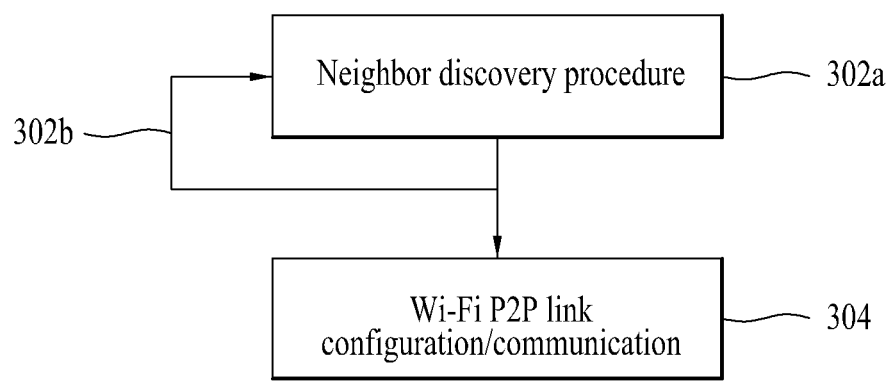
FIG. 3 is a flowchart illustrating a method for constructing a Wi-Fi P2P network.

FIG. 3 is a flowchart illustrating a method for constructing a Wi-Fi P2P network.

Referring to FIG. 3, the Wi-Fi P2P network construction process may be broadly classified into two processes. A first process is a neighbor discovery (ND) procedure in step S302a. A second process is a P2P link configuration and communication process in step S304. Through the neighbor discovery process, the Wi-Fi P2P device (e.g., 202 of FIG. 2) searches for another neighbor Wi-Fi P2P device (e.g., 204 of FIG. 2) contained within (radio) coverage thereof, and may obtain information of association (e.g., pre-association) with the corresponding Wi-Fi P2P device. In this case, the pre-association may indicate a second layer pre-association in a radio protocol. For example, information needed for the pre-association may include ID information of the neighbor Wi-Fi P2P device. The neighbor discovery process may be carried out per available radio channel in step S302b. Thereafter, the Wi-Fi P2P device 202 may perform Wi-Fi P2P link configuration/communication with another Wi-Fi P2P device 204. For example, after the Wi-Fi P2P device 202 is connected to a peripheral Wi-Fi P2P device 204, it is determined whether the corresponding Wi-Fi P2P device 204 is a Wi-Fi P2P device incapable of satisfying service requirements of a user. For this purpose, after the Wi-Fi P2P device 202 is connected to the peripheral Wi-Fi P2P device 204 and the second layer pre-association, the Wi-Fi P2P device 202 can explore the corresponding Wi-Fi P2P device 204. If the corresponding Wi-Fi P2P device 204 does not satisfy service requirements of the user, the Wi-Fi P2P device 202 may sever association of the second layer configured in the corresponding Wi-Fi P2P device 204, and may configure the second layer association with another Wi-Fi P2P device. In contrast, if the corresponding Wi-Fi P2P device 204 satisfies the user service requirements, two Wi-Fi P2P devices (202, 204) can transmit and receive signals through the P2P link.

Figure 4A:
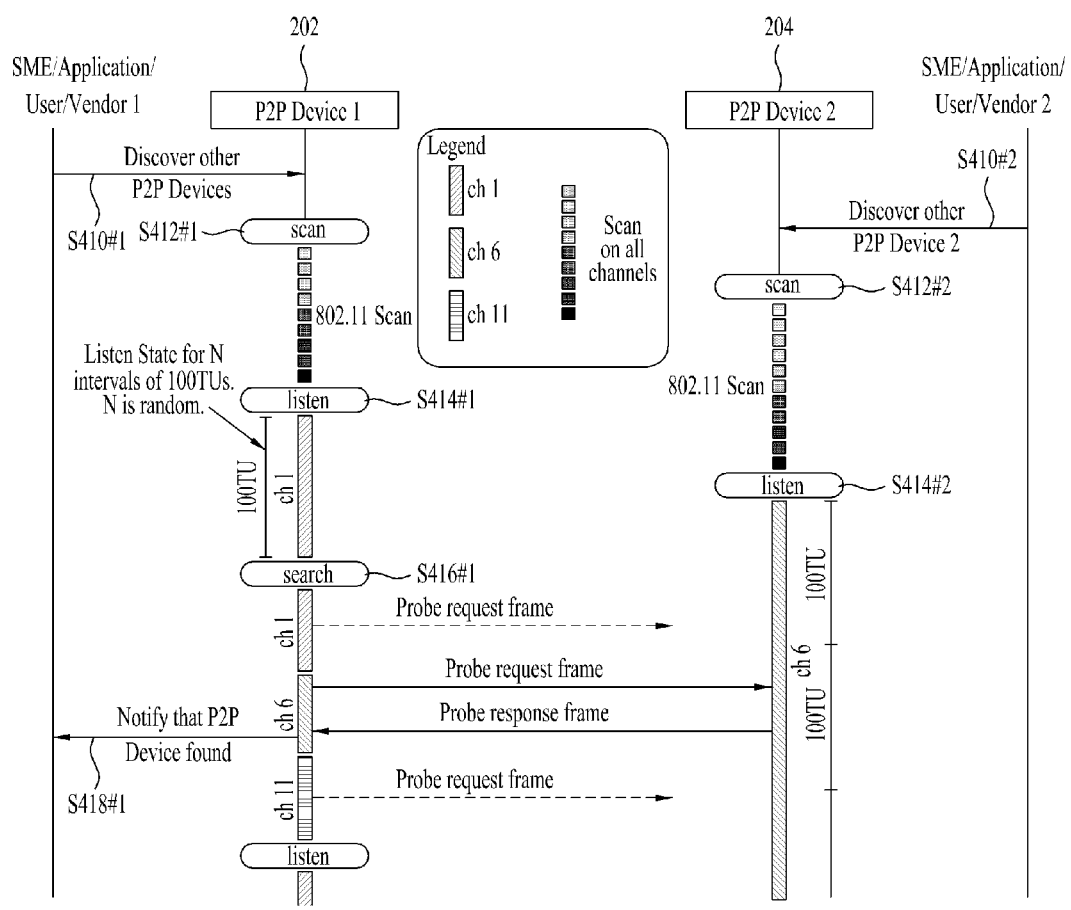
FIGS. 4a and 4b are conceptual diagrams illustrating neighbor discovery processes.

The neighbor discovery process is shown in FIG. 4a. FIG. 4a exemplarily shows the operations between one Wi-Fi P2P device 202 and the other Wi-Fi P2P device 204 shown in FIG. 3.

Referring to FIG. 4a, the neighbor discovery process of FIG. 3 may be initiated by indication of station management entity (SME)/application/user/vendor in step S410. The scanning step S412 may include the operation for scanning all available RF channels according to 802.11. Through the above-mentioned operation, the P2P device can confirm the best operation channel. The search steps (S414~S416) may include a listening mode S414 and a search mode S416. The P2P device may alternately repeat the listening mode S414 and the search mode S416. The P2P devices (202, 204) may perform active search using a probe request frame in the search mode S416. For rapid search, the searching range may be limited to social channels denoted by Channels #1, #6, #11 (2412, 2437, 2462 MHz). In addition, the P2P devices (202, 204) may select only one channel from among three social channels in the listening mode S414, and maintain a reception status. In this case, if the other P2P device (e.g., 202) receives the probe request frame in the search mode, the P2P device (e.g., 204) generates a probe response frame in response to the received probe request frame. A time of the listening mode S414 may be given at random (e.g., 100, 200, 300 time units (TUs)). The P2P device continuously repeats the search mode and the reception mode so that it reaches a common channel. After the P2P device discovers another P2P device, the P2P device may discover/exchange a device type, a name of a manufacturing company, or a name of a familiar device using the probe request frame and the probe response frame such that the P2P device can be selectively coupled to the corresponding P2P device. If the P2P device discovers the peripheral P2P device and obtains necessary information through the neighbor discovery process, the P2P device (e.g., 202) may inform SME/application/UE/vendor of the P2P device discovery in step S418.

Figure 4B:
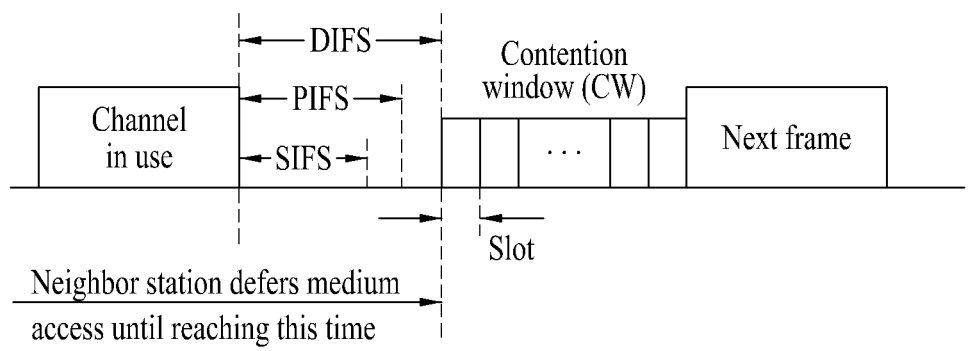

FIG. 4b shows data communication based on a Carrier Sense Multiple Access/Collision Avoidance (CSMA/CA) scheme. The CSMA/CA scheme is designed to use a contention-based medium access control (MAC) scheme in a distributed environment without using the centralized controller.

Referring to FIG. 4b, devices are always designed to detect carriers of the network, and attempt to perform data transmission after waiting a predetermined time when the network is empty. In more detail, the station (STA) may determine whether a channel is used during an Inter-Frame Spacing (IFS) using a carrier sensing method. Here, IFS indicates spacing/interval between frames. For example, DCF IFS (DIFS), PCF IFS (PIFS), Short IFS (SIFS), and Extended IFS (EIFS) are defined in IFS. If the channel is continuously in a non-used state during the IFS, the corresponding STA attempts to perform data transmission after lapse of a random backoff time within a contention window (CW). The above-mentioned method can prevent the occurrence of collision generated when at least two STAs attempt to perform simultaneous transmission, and this collision prevention action will hereinafter be referred to as collision avoidance (CA).

In the meantime, if frame transmission fails, the contention window (CW) value has a value of the next stage. If the CW value reaches a maximum value (CWmax), the CW value is not increased any more and is kept at the maximum value (CWmax). If frame transmission fails, a retransmission (ReTx) counter value of the STA is incremented by one. If the retransmission (ReTx) counter value exceeds a threshold value, the corresponding frame is discarded. If frame transmission was successful or discarded, the CW value is set to a minimum value (CWmin).

Although not shown in the drawings, the RTS/CTS access mode may be used as another scheme for data communication. In the RTS/CTS access mode, control frames (Request to Send/Clear to Send, RTS/CTS) are exchanged before transmission of the data frame so that a channel can be pre-occupied. This method can replace one collision caused by data frame transmission with another collision caused by a short control frame, resulting in reduction of waste of channels.

Presently, P2P may be mainly used for semi-static communication such as remote printing, photo sharing, etc. However, due to generalization of Wi-Fi devices and location based services, P2P availability is gradually increased. For example, wireless devices registered with chat services (e.g., Social Network Service (SNS)) can recognize radio devices located in a neighboring region and transmit/receive information on the basis of the location based service. It is expected that the P2P device will be actively used in location-based advertisement provision, location-based news broadcasting, online data sharing, and game interaction between wireless devices. For convenience of description, such P2P application will hereinafter be referred to as new P2P application.

Figure 5:
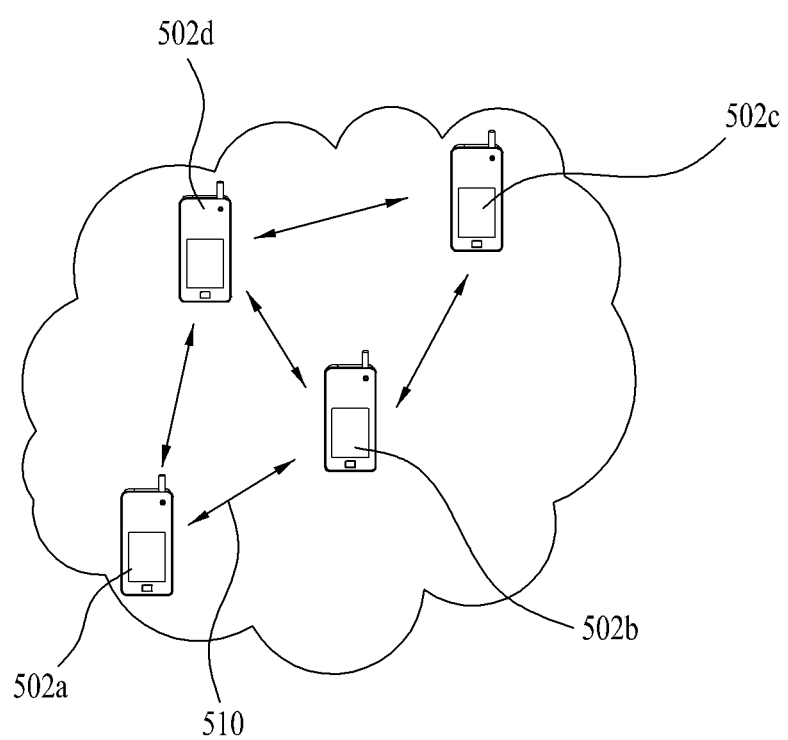
FIG. 5 shows an exemplary Wi-Fi P2P network.

FIG. 5 shows one example of a social Wi-Fi network. The P2P devices constructing the social Wi-Fi network may be classified into a static node, a semi-static node, and a mobile node according to mobility. The static node may include a Wi-Fi device fixed to a station or the like. The semi-static node may include a moving Wi-Fi device configured to move in response to a predetermined pattern, for example, a Wi-Fi device installed in a transportation vehicle or the like. The mobile node may include a Wi-Fi device (e.g., a smartphone including a Wi-Fi chipset) having free mobility.

Referring to FIG. 5, a plurality of P2P devices (502a~502d) may be configured to perform P2P communication 510 over a Wi-Fi P2P network, the P2P device(s) constructing the Wi-Fi P2P network may be changed at any time in response to movement of the P2P device(s), and the Wi-Fi P2P network may be newly generated or dismantled dynamically or within a short time. As described above, the social Wi-Fi network is characterized in that P2P communication between the plurality of P2P devices is achieved or terminated dynamically or within a short time under a dense network environment. In addition, the social Wi-Fi network should be able to efficiently support one-way broadcasting (e.g., advertisement) when there is a sleep node or the like.

However, since the legacy P2P mechanism does not consider dynamic P2P communication among a plurality of P2P devices, it is impossible for the legacy P2P mechanism to efficiently cope with the social Wi-Fi network. For example, the legacy Wi-Fi P2P neighbor discovery process shown in FIGS. 3 to 4 is inappropriate for the social Wi-Fi network. As shown in FIG. 4, the neighbor discovery process may include the search mode and the listening mode and be independently configured in each P2P device, and this information is not shared among the P2P devices. Accordingly, for P2P communication, the P2P devices repeat the search mode/listening mode using the on-demand/blind scheme, and may reach a mutual common channel. The neighbor discovery process of the blind scheme can reduce unnecessary signaling overhead in the case that there is a small number of P2P devices participating in the Wi-Fi P2P network, resulting in increased resource efficiency. However, if the number of P2P devices participating in the Wi-Fi P2P network is increased significantly, the following problems may occur. In more detail, according to the legacy scheme, (1) a long-time latency is consumed until neighbor discovery is completed, (2) inefficiency (high overhead) of neighbor discovery in the dense network, and (3) high communication overhead for connection (or association) configuration.

In order to solve the above-mentioned problems, the present invention provides P2P service/device discovery, control/data communication scheduling, etc. so as to efficiently perform Wi-Fi P2P communication.

A method for efficiently performing the neighbor discovery process will hereinafter be described. For convenience of description, the neighbor discovery process proposed by the present invention is referred to as automatic neighbor discovery. The legacy scheme of FIG. 4 is referred to as On-Demand neighbor discovery. The automatic neighbor discovery scheme and the legacy on-demand neighbor discovery scheme may be combined with each other so as to reduce latency consumed for the P2P service/device discovery. For example, the automatic neighbor discovery scheme according to this example is first carried out, the automatic neighbor discovery scheme is ceased according to situation, and then the on-demand neighbor discovery scheme can be carried out.

Figure 6:
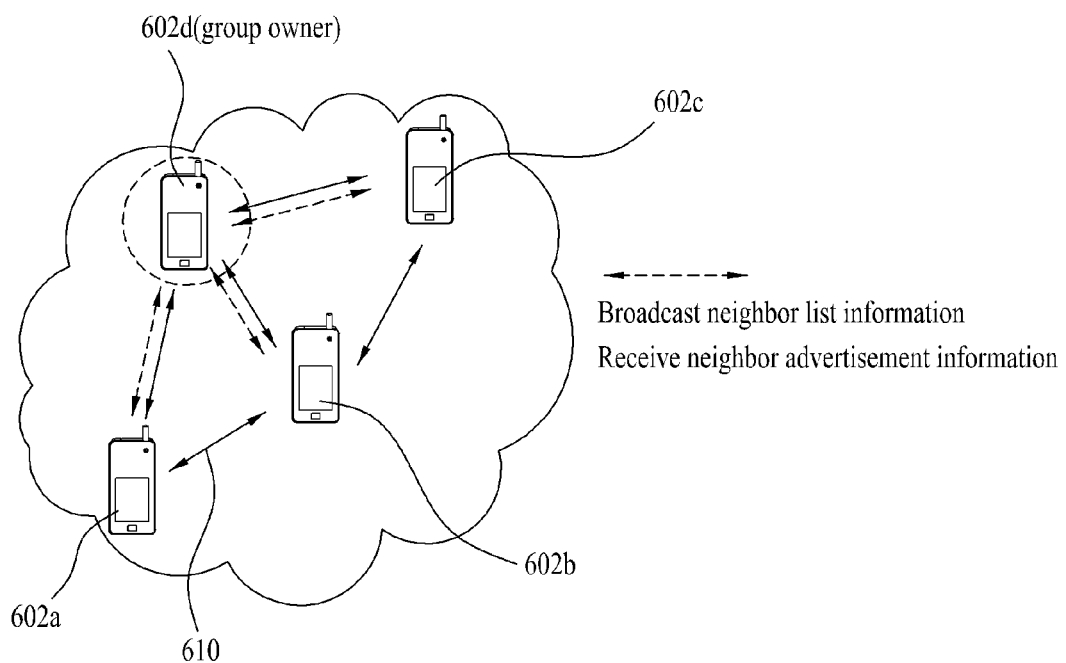
FIG. 6 shows an exemplary neighbor discovery process according to the present invention.

FIG. 6 is a conceptual diagram illustrating the neighbor discovery process according to the present invention. The basic situation/assumption of FIG. 6 is identical to those of FIG. 5. Unlike the concept of FIG. 5, the neighbor discovery process of FIG. 6 can provide a group owner (GO) 602d to the Wi-Fi P2P network. In this example, the P2P devices may construct one or more groups on the basis of location, interest content, power, etc. Each P2P group may include one group owner (GO) and one or more P2P devices (hereinafter referred to as a P2P client). However, the group owner (GO) cannot participate in another P2P group as a client. Different P2P groups have different scheduling cycles, and the P2P clients participating in multiple P2P groups must select one group during P2P communication.

Referring to FIG. 6, the group owner (GO) may broadcast neighbor list information to the peripheral P2P device (i.e., P2P client) as denoted by a dotted arrow, and may receive neighbor advertisement information from the P2P device that wants to participate in the P2P group. In this case, the neighbor list information may include, for example, P2P device ID information (e.g., device ID, device nickname, etc.), mobility associated information (e.g., moving speed), power information, P2P service associated information (e.g., a service category, a social group, etc.), and information regarding pre-association with the corresponding P2P device. The neighbor list information may be broadcast at the request of the P2P device, or may be periodically broadcast by the request of the P2P device. The neighbor list information may be transmitted through a beacon. The group owner 602d may be pre-configured, any one of the P2P devices (e.g., 602a to 602d) may be selected as a group owner (GO) by a network in response to a situation, or any one of the P2P devices (e.g., 602a to 602d) may autonomously serve as a group owner according to situation. For example, a static node and a semi-static node may be established as a group owner (GO). However, if there is no available static/semi-static node (if the network can be managed with a sufficient amount of power), the mobile node may generate/initiate the P2P group or may serve as a group owner (GO). The number of P2P devices capable of being managed by the group owner 602d may be limited according to Wi-Fi P2P capability/coverage/available power, etc.

The neighbor advertisement information may be used for the P2P devices (602a to 602c) to inform the group owner 602d of an intention of participating in the group. In addition, the neighbor advertisement information may include information needed for the group owner 602d to generate/manage the neighbor list, for example, P2P device ID information (e.g., device ID, device nickname, etc.), mobility associated information (e.g., moving speed), power information, P2P service associated information (e.g., a service category, a social group, etc.). Transmission of neighbor advertisement information may be initiated by reception of the neighbor list information, or may be initiated when P2P group participation is needed irrespective of reception of the neighbor list information.

The neighbor list information may be periodically transmitted. However, the neighbor list may be periodically transmitted only when the P2P devices (602a to 602c) recognize the presence of the group owner 602d or only when the P2P devices (602a to 602c) do not escape from the WFD network. For example, if the P2P devices (602a to 602c) do not receive the neighbor list information for a predetermined time or more, the P2P devices (602a to 602c) may stop transmission of the neighbor advertisement information. In this case, each of the P2P devices (602a to 602c) may wait until new neighbor list information is received, or may serve as a group owner (e.g., neighbor list information generation/management/broadcasting).

The P2P devices (602a to 602d) can recognize information regarding the presence/ID information/pre-association of the device capable of performing P2P communication on the basis of the neighbor list information, such that the P2P devices (602a to 602d) can obtain information regarding all the associated P2P devices when only the P2P group owner is found, without performing the neighbor discovery process for all the P2P devices. After acquiring the neighbor list information, the P2P device (e.g., 602a) may perform P2P communication 610 with the corresponding P2P device according to a desired service category or the like.

For reference, the P2P group and the P2P group owner have been defined in the legacy P2P mechanism. However, according to the legacy P2P mechanism, the P2P group enables the P2P group owner to serve as an AP, and enables the P2P client to serve as the STA. In this regard, the legacy P2P group is similar to a BSS of FIG. 1, and is irrelevant to the fact that the P2P group owner manages/broadcasts the neighbor list and the P2P client transmits the neighbor advertisement information.

A method for efficiently performing control/data communication in Wi-Fi P2P will hereinafter be described in detail.

Figure 7:
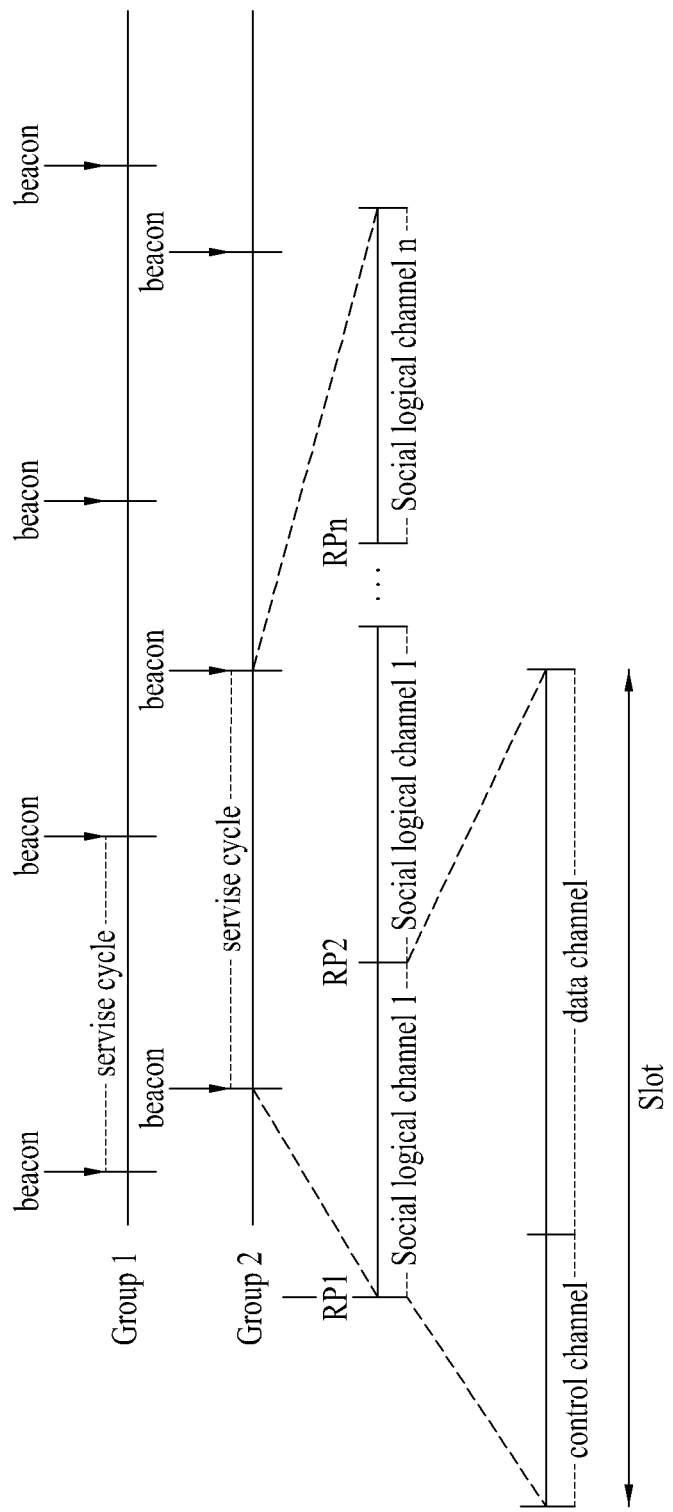
FIGS. 7 and 8 are flowcharts illustrating signal transmission processes according to the present invention.

FIG. 7 is a flowchart illustrating a method for performing P2P communication according to the present invention. P2P communication for use in this example of FIG. 7 is carried out on the assumption that a P2P group of FIG. 6 is present.

Referring to FIG. 7, a group owner for each group can independently transmit a beacon message. Information contained in the beacon message will be described later. In this example, spacing/interval between the beacon messages is given as a service cycle, and the service cycle length (e.g., spacing/interval between the beacon messages) may be notified through the beacon message. The spacing between the beacon messages and the service cycle length may be identical to each other, or may be different from each other (e.g., spacing between the beacon messages>the service cycle length). The spacing between the beacon messages or the service cycle length may be changed according to the number of slots contained in the corresponding section and/or the slot length. If a constant transmission spacing between the beacon message is given, the beacon message spacing (also called "beacon message interval") and/or the service cycle length may be omitted from the beacon message. In this case, the service cycle may indicate a cycle/period/interval required for that all/some services of the corresponding P2P group (preferably, all services) are provided once. The service cycle length may be changed according to the number of services associated with the corresponding P2P group. If there are a large number of services associated with the P2P group, all the services can be provided through all the service cycles. The number of services (or social logical channels) per service cycle may be decided by a group owner.

Preferably, the service cycle may include one or more slots. Each slot may correspond to each service (e.g., a chat service, a vehicle arrival time notification service, an advertisement provision service, a news provision service, etc.) (type) provided from the P2P group. Each service (i.e., each slot) (type) may correspond to a social logical channel, and may be identified by a logical channel index (social logical channels 1~n). If necessary, the same service type (or a social logical channel) may also be allocated to two or more slots. In this case, the social logical channel may indicate a logical channel corresponding to the P2P application. For this purpose, the group owner (GO) may allocate one or more Rendezvous Points (RPs) to the service cycle. In this case, each RP may indicate a start time (or a start point of the start period allocated for the corresponding service type) of the corresponding slot. The same value may be assigned to the length of each slot within the service cycle irrespective of service types, or may be independently given to the length of each slot according to service types. If the slot length is independently given within the service cycle, the group owner may indicate not only RP but also the slot length corresponding to the RP. Accordingly, the location of each slot within a service cycle may be given as [RP, RP+slot duration]. Information indicating RP (and the slot length corresponding to the RP) may be contained in the beacon message. Although the drawings have disclosed the exemplary case in which multiple slots are successively allocated within the service cycle for convenience of description, it should be noted that the multiple slots may also be discontinuously allocated as necessary.

In this example, one slot may include a control sub-slot for a control channel and a data sub-slot for a data channel. The control sub-slot and the data sub-slot are multiplexed according to the Time Division Multiplexing (TDM) scheme. For example, the control channel (CCH) (or a control sub-slot) may be used for transmission/reception of a beacon, a probe message (request/response), transmission of specific data (e.g., emergency data, high priority data, etc.), neighbor advertisement information (See FIG. 6) (here, the neighbor advertisement information may include data to be transmitted or data to be received), other control messages, etc. That is, the next data channel (or data sub-slot) may broadcast information required for data exchange through a control channel (or a control sub-slot). A data channel (e.g., Shared Channel, SCH) (or a data sub-slot) may be used to transmit/receive data (e.g., chat content, advertisements, vehicle arrival times, news, etc.). Data may be broadcast to a plurality of receivers. If the receiver is recognized, data may be unicast only to the corresponding receiver. Although the scope of the present invention is not limited to this example, a control channel may be used to transmit control information for neighbor discovery, and a data channel may be used to transmit P2P data. As described above, basic control information needed for neighbor discovery and/or P2P communication may be provided over the control channel in advance, thereby no association is achieved between P2P devices, and P2P communication can be carried out in the next data channel.

For convenience of description and better understanding of the present invention, in the case of Group 1 of FIG. 7, it is assumed that Group 1/Group Owner are associated with three types of services (e.g., chatting, advertisement, and data sharing). In addition, the group owner of Group 1 assumes that Slot 1 is allocated for chatting, Slot 2 is allocated for advertisement, and Slot 3 is allocated for data sharing. In this case, the P2P client of Group 1 may perform P2P communication at a slot to which an interested service is allocated, and may stay in the sleep mode at the remaining slots other than the above slot. For example, if the P2P client desires data sharing, the P2P client awakes from Slot 3 and attempts to perform data sharing. The P2P client can stay in the sleep mode at Slots 1~2.

Although the scope of the present invention is not limited only to the above example, signal transmission/reception based on Wi-Fi P2P within the slot may be achieved using the CSMA/CA scheme, the RTS/CTS access mode, etc. shown in FIG. 4*b*. In the meantime, during a BSS mode of FIG. 1, STA listens to the beacon message sent from the AP so as to communicate with an AP, and registers in the BSS. A BSS registration process may include some steps, for example, association, authentication, etc. However, the BSS registration process has to consume a long period of time, such that the BSS registration process is inappropriate for the social Wi-Fi network dynamically formed/changed for a short time between the P2P devices. In order to solve the above problems, the IEEE 802.11p association process may be adapted to Wi-Fi P2P communication as necessary. In more detail, the Wi-Fi P2P devices may be configured to achieve direct data communication without registering in the legacy BSS in case that channels are identical to each other. For this purpose, a new BSS for Wi-Fi P2P may be defined (for convenience of description, PBSS). In this case, one P2P device (e.g., group owner or P2P client) may transmit the beacon message and at the same time can configure a PBSS. The beacon message may include higher layer information needed for association/authentication in IEEE 802.11, PBSS provision service, PBSS subscription information, etc. In order to register the P2P client in the PBSS, the P2P client has only to receive a beacon of the PBSS, such that the legacy IEEE 802.11 association/authentication processes may be omitted.

The beacon message of FIG. 7 may include at least one of {a spacing of the beacon message, the length of service cycle, the RP location, the number of slots, a control channel (CCH) length, a data channel (e.g., SCH) length, and the list of [slot ID, service type, and the number of registered neighbors (i.e., registered P2P devices)]}. This example may be applied to the case in which the same length is given to the mode slot within the service cycle. If the length of each slot is independently given within the service cycle or if multiple slots are discontinuous, the beacon message may indicate information for identifying the location and/or length of each slot. For example, the beacon message may indicate information regarding [the RP location within the service cycle, the slot length (and/or the length of at least one of a control channel (CCH) and a data channel (e.g., SCH))] for each slot, or may indicate only the slot length (and/or the length of at least one of a control channel (CCH) and a data channel (e.g., SCH)) for each slot.

In accordance with the above-mentioned scheme, time synchronization is achieved between the P2P devices of a group on the basis of a beacon message sent from the group owner, such that latency for P2P communication can be reduced. In addition, the P2P device can awake from an interested slot so as to perform P2P communication, and can stay in the sleep mode at the remaining slots other than the interested slot, such that power of the P2P devices can be efficiently managed.

Figure 8:
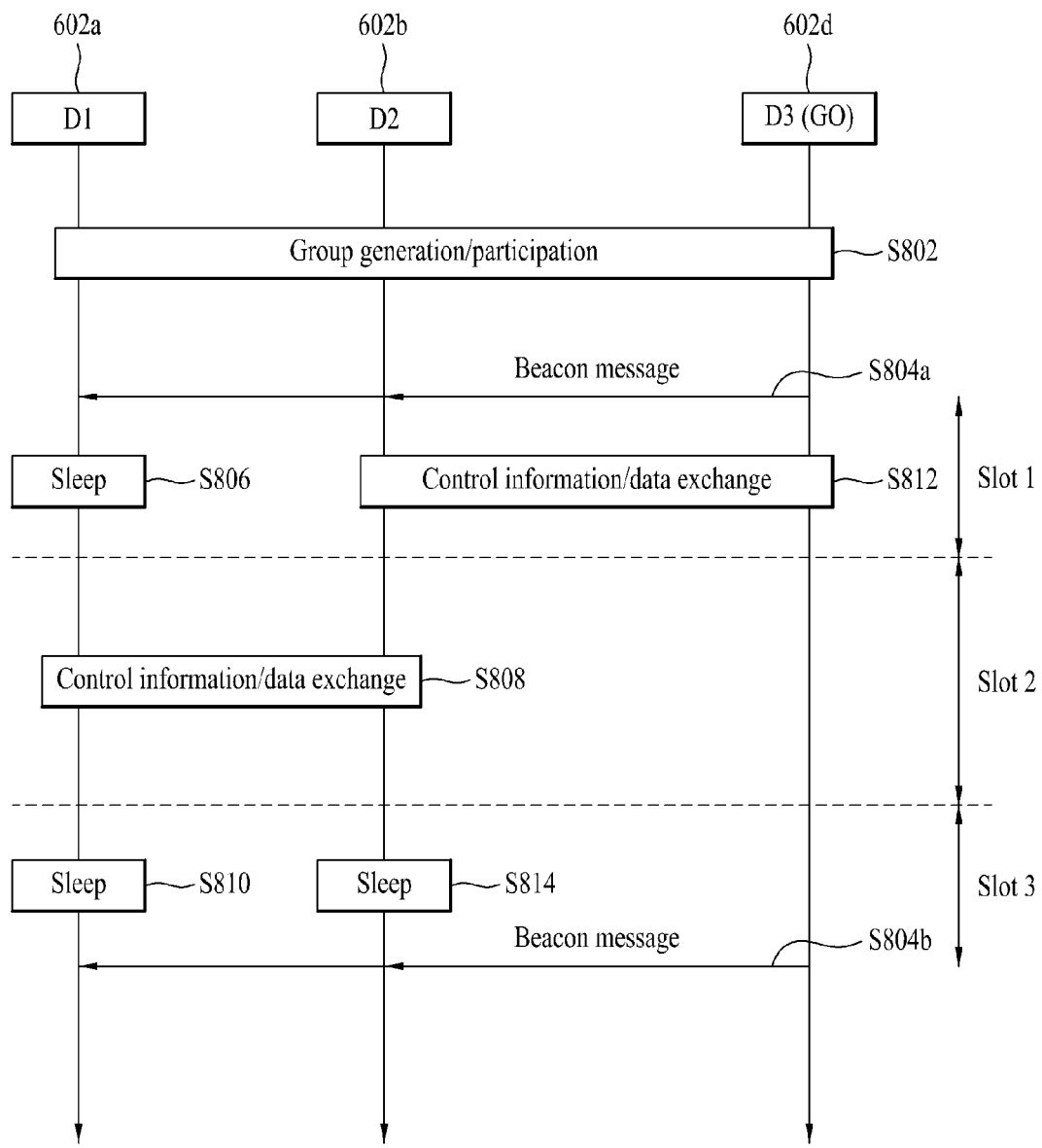

FIG. 8 is a flowchart illustrating a P2P communication process according to one embodiment of the present invention. The basic situation/assumption is identical/similar to those of FIGS. 6 and 7. For convenience of description, although three P2P devices have disclosed the exemplary case in which the P2P devices participate in the P2P group, it should be noted that four or more P2P devices can participate in the P2P group in the same or similar manner.

Referring to FIG. 8, a group may be created among D1 (e.g., 602*a* of FIG. 6), D2 (e.g., 602*b* of FIG. 6), and D3 (e.g., 602*d* of FIG. 6) in step S802. Here, it is assumed that the group owner (GO) is D3, and a group member (i.e., P2P client) includes D1 and D2. In this example, the group owner D3 may broadcast the beacon message to the P2P client in the group in steps S804*a* and S804*b*. The beacon message may be periodically broadcast or may be aperiodically broadcast in consideration of the P2P service. In this case, the beacon message may include, for example, at least one of {a spacing of the beacon message, the length of service cycle, the RP location, the number of slots, a control channel (CCH) length, a data channel (e.g., SCH) length, and the list of [slot ID, service type, and the number of registered neighbors (i.e., registered P2P devices)]}. If the length of each slot is independently given within the service cycle, the beacon message may indicate information for identifying the location/length of each slot. For example, the beacon message may indicate information regarding [the RP location within the service cycle, the slot length (and/or the length of at least one of a control channel (CCH) and a data channel (e.g., SCH))] for each slot (e.g., if slots are discontinuously allocated), or may indicate only the slot length (and/or the length of at least one of a control channel (CCH) and a data channel (e.g., SCH)) for each slot (e.g., if slots are continuously allocated). If only the slot length is notified, information regarding the length of the last slot may be omitted.

This example shows the exemplary case in which three slots (i.e., three types of services) are allocated within one service cycle through the beacon message of the step S804*a*. Although the scope of the present invention is not limited thereto, an advertisement service may be allocated to Slot 1, a chat service may be allocated to Slot 2, and an online game service may be allocated to Slot 3. In case of D1, the advertisement service and the online game service are not interested, such that D1 stays in the sleep mode at Slot 1 and Slot 3 in steps S806 and S808. In contrast, D1 is interested in the chat service, so that the D1 awakes from Slot 2 and performs P2P communication for chatting along with D2 in step S808. In case of D2, D2 is interested in the advertisement service and the chat service, P2P communication for receiving the advertisement service from D3 is performed at Slot 1 in step S812, and P2P communication for chatting with D1 may be performed at Slot 2 in step S808. In contrast, D2 is not interested in the online game service, so that the D2 stays in the sleep mode in step S814.

Figure 9:
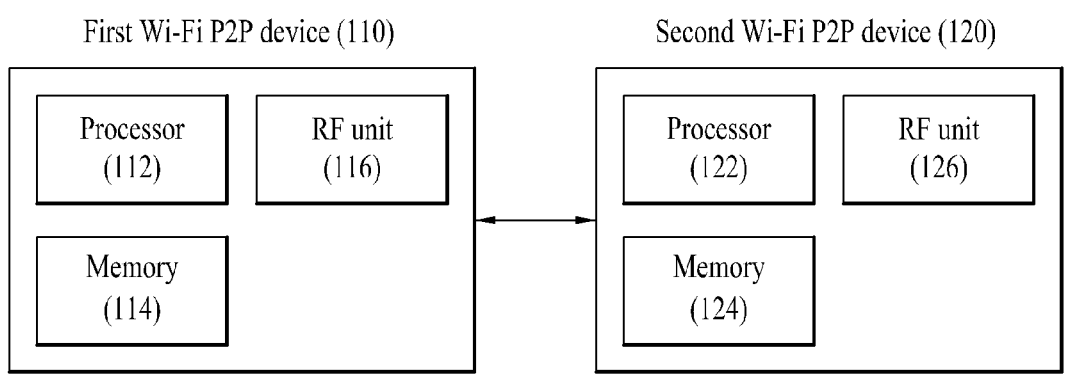
FIG. 9 is a block diagram illustrating a Wi-Fi P2P device applicable to the present invention.

FIG. 9 is a block diagram illustrating a Wi-Fi P2P device applicable to the present invention.

Referring to FIG. 9, the Wi-Fi P2P network includes a first Wi-Fi P2P device 110 and a second Wi-Fi P2P device 120. The first Wi-Fi P2P device 110 includes a processor 112, a memory 114, and a radio frequency (RF) unit 116. The second Wi-Fi P2P device 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The second Wi-Fi P2P device 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The first Wi-Fi P2P device 110 and/or the second Wi-Fi P2P device 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to claims other than the specific claims to constitute the embodiment or add new claims by means of amendment after the application is filed.

The above-described embodiments may be implemented by various means, for example, by hardware, firmware, software, or a combination thereof. In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Exemplary embodiments of the present invention can be applied to a P2P communication device. In more detail, the embodiments of the present invention can be applied to a Wi-Fi P2P communication device.

The invention claimed is:

1. A method for performing communication using a wireless fidelity (Wi-Fi) peer-to-peer (P2P) device, the method comprising:
receiving a first beacon message from an owner of a Wi-Fi P2P group; and
identifying a plurality of slots arranged between a reception time of the first beacon message and a reception time of a second beacon message subsequent to the first beacon message,
wherein the plurality of slots corresponds to a plurality of service types,
the Wi-Fi P2P device performs operations of Wi-Fi P2P communication in one or more slots corresponding to an interested service from among the plurality of slots, and
the Wi-Fi P2P device is in a sleep mode in one or more slots corresponding to a non-interested service from among the plurality of slots.

2. The method according to claim 1, wherein each slot corresponds to one logical channel.

3. The method according to claim 1, wherein each slot includes a first sub-slot for a control channel and a second sub-slot for a data channel, wherein the first sub-slot and the second sub-slot are multiplexed according to a Time Division Multiplexing (TDM) scheme.

4. The method according to claim 1, wherein the first sub-slot is used to transmit control information for neighbor discovery, and the second sub-slot is used to transmit P2P data.

5. The method according to claim 1, wherein the first beacon message includes at least one of information indicating a beacon message interval including the plurality of slots and information indicating a length of a service cycle.

6. The method according to claim 5, wherein the first beacon message further includes at least one of information indicating the number of a plurality of slots, information indicating a start time of each slot, and information indicating a length of each slot.

7. The method according to claim 6, wherein each slot includes a first sub-slot for a control channel and a second sub-slot for a data channel, and the first beacon message includes at least one of information indicating a length of the first sub-slot per slot and information indicating a length of the second sub-slot per slot.

8. The method according to claim 1, wherein the first beacon message includes a slot identifier (ID) of each slot, a service type of each slot, and information regarding the number of Wi-Fi P2P devices registered for the service type.

9. A wireless fidelity (Wi-Fi) peer-to-peer (P2P) device configured to perform a Wi-Fi P2P communication, comprising:
   a radio frequency (RF) unit; and
   a processor,
   wherein the processor is configured to receive a first beacon message from an owner of a Wi-Fi P2P group, identify a plurality of slots arranged between a reception time of the first beacon message and a reception time of a second beacon message subsequent to the first beacon message,
   wherein the plurality of slots corresponds to a plurality of service types,
   the processor performs operations of Wi-Fi P2P communication in one or more slots corresponding to an interested service from among the plurality of slots, and is in a sleep mode in one or more slots corresponding to a non-interested service from among the plurality of slots.

10. The Wi-Fi P2P device according to claim 9, wherein each slot corresponds to one logical channel.

11. The Wi-Fi P2P device according to claim 9, wherein each slot includes a first sub-slot for a control channel and a second sub-slot for a data channel, wherein the first sub-slot and the second sub-slot are multiplexed according to a Time Division Multiplexing (TDM) scheme.

12. The Wi-Fi P2P device according to claim 9, wherein the first sub-slot is used to transmit control information for neighbor discovery, and the second sub-slot is used to transmit P2P data.

13. The Wi-Fi P2P device according to claim 9, wherein the first beacon message includes at least one of information indicating a beacon message interval including the plurality of slots and information indicating a length of a service cycle.

14. The Wi-Fi P2P device according to claim 13, wherein the first beacon message further includes at least one of information indicating the number of a plurality of slots, information indicating a start time of each slot, and information indicating a length of each slot.

15. The Wi-Fi P2P device according to claim 14, wherein each slot includes a first sub-slot for a control channel and a second sub-slot for a data channel, and the first beacon message includes at least one of information indicating a length of the first sub-slot per slot and information indicating a length of the second sub-slot per slot.

16. The Wi-Fi P2P device according to claim 9, wherein the first beacon message includes a slot identifier (ID) of each slot, a service type of each slot, and information regarding the number of Wi-Fi P2P devices registered for the service type.

* * * * *